UNITED STATES PATENT OFFICE.

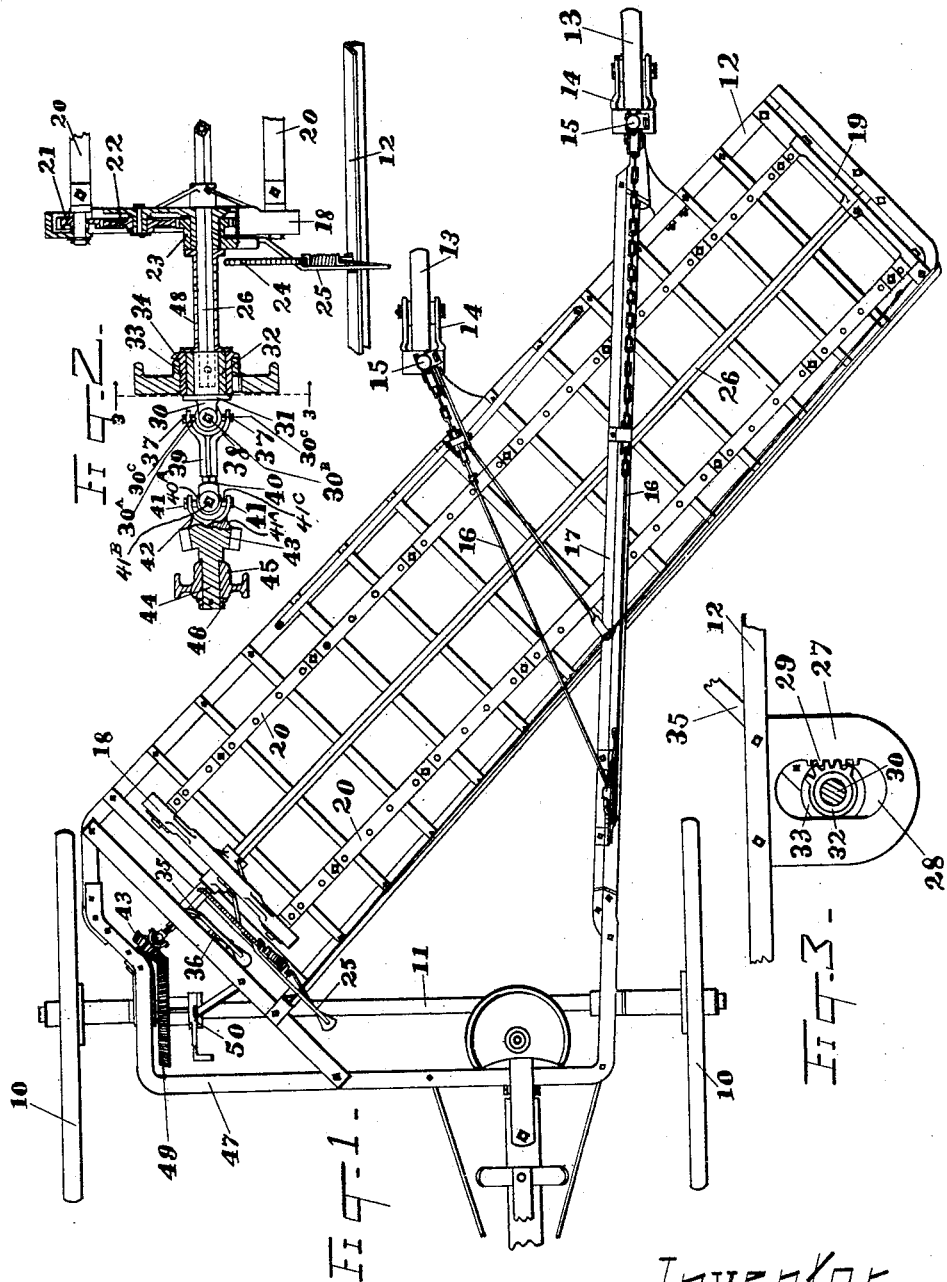

JOSEPH DAIN, DECEASED, LATE OF MOLINE, ILLINOIS, BY JOSEPH DAIN, JR., ADMINISTRATOR, OF MOLINE, ILLINOIS, ASSIGNOR TO THE DAIN MANUFACTURING COMPANY OF IOWA, OF OTTUMWA, IOWA, A CORPORATION OF IOWA.

SIDE-DELIVERY RAKE.

1,399,197. Specification of Letters Patent. Patented Dec. 6, 1921.

Application filed July 10, 1919. Serial No. 309,887.

*To all whom it may concern:*

Be it known that I, JOSEPH DAIN, Jr., a citizen of the United States, residing at Moline, in the county of Rock Island and State of Illinois, administrator of the estate of JOSEPH DAIN, deceased, at the time of his death a citizen of the United States, and a resident of said Moline, Illinois, hereby declare that the said JOSEPH DAIN did invent certain new and useful Improvements in Side-Delivery Rakes, of which the following is a specification, reference being had to the accompanying drawings.

This invention relates to side-delivery rakes of the type wherein a rotary reel is arranged at an angle to the line of draft, several series of rake-teeth being carried by the reel and all of such teeth being maintained at the same angle so as to be properly presented in effective working position to the hay to be raked. Such teeth are held in the desired uniform working position by the employment of suitable mechanism carried by the forward or inner reel-head and comprising, ordinarily, a set of gears in connection with each tooth-bar and a single other gear that is in mesh with one of the gears of each of said sets of gears.

It has been the common practice to provide means to support the frame that carries the reel by ground-engaging devices—usually caster-wheels—between which and said frame a relative vertical adjustment could be effected, the frame during such adjustment turning about the main axle of the machine as an axis. In such adjustment, of course, it is evident that the outer or rear end of the said frame and the reel supported therein would move through a greater arc than the other end of the frame and reel, and as it is sometimes deemed desirable that such other or inner end of the reel be given a greater range of vertical movement than is possible by the character of adjustment referred to above, various attempts have been made to provide means for an additional adjustment. It is the object of this invention to provide means for adjusting the inner end of the reel vertically independently of the adjustment that is effected by the relative movement between the said ground-engaging devices and the reel-carrying frame. This object is accomplished by the means shown in the drawings and hereinafter particularly described. That which is believed to be new will be set forth in the claims.

In the drawings,—

Figure 1 is a plan view of a side-delivery rotary rake in which is embodied the improvements of said JOSEPH DAIN;

Fig. 2 is a detail, partly in horizontal section and partly in plan view, showing the extensible and jointed connection between the reel-shaft and the bevel pinion by which power is applied to such shaft from the main axle of the machine; and Fig. 3 is a detail, being a cross-section taken at line 3—3 of Fig. 2.

Referring to the several figures of the drawings,—10—10 indicate a pair of carrying wheels which are mounted upon an axle 11. Such wheels and axle will be connected together by any suitable means so that the axle will be caused to rotate upon the forward movement of the machine, but will not rotate when the machine is backed. It is not deemed necessary to illustrate such means as they are common and well understood. 12 indicates the reel frame which may be of any usual construction and connected in any desired manner with the axle 11 so that when the reel frame is adjusted vertically relative to its rear ground-engaging support or supports the frame will rock about such axle as an axis. The reel frame as usual extends diagonally rearward so that the hay operated upon will be moved laterally. In the drawing is shown the machine provided with two of the ground-engaging supports referred to, the same comprising caster wheels 13 each secured between a yoke 14 from which arises a standard 15, and from each standard extends a connection 16 to a common lever mounted on the usual long rearwardly extending truss member 17. These adjusting devices are not illustrated in detail as by themselves they form no part of my invention, and, indeed, may be of any well-known construction. The details, however, of the particular two-wheel supports are clearly shown and described in the Letters Patent No. 1,313,880, dated August 26, 1919, granted upon the application of one Leon R. Clausen.

The reel that is rotatably mounted in the frame 12 comprises inner and outer heads 18 and 19 which are connected together by a plurality—preferably three—of bars 20 that carry the rake-teeth. The inner head 18 will have rotatably secured opposite its outer face a plurality of sets of gears, the number of sets corresponding in number to the number of the tooth bars and in the outer gear of each set the forward end of one of the tooth bars will be secured as usual. In Fig. 2 is shown in section one of the sets of gears referred to, the outer gear being indicated by 21 and the inner gear that is in mesh therewith being indicated by 22—the latter gear being, as shown, journaled on a stud projecting from the head. The inner member 22 of each of the sets of gears referred to is in mesh with a smaller central gear, as 23, which is ordinarily held fixed against rotation, but which by reason of being mounted on a cylindrical hub member may be rocked in order to effect a change in the position of the tooth bars so as to incline the teeth carried thereby as desired. There is shown, but not in detail, a lever and movable sector construction for accomplishing this rocking of the central gear that is shown in and forms the subject-matter of the patent to L. R. Clausen, No. 1,283,674, dated November 5, 1918. The pivoted sector referred to is here indicated by 24 and the lever that interlocks with such sector and is connected at its inner end with the gear 23 is indicated by 25. Inasmuch as the inner or forward end of the reel shaft 26 is moved up and down in a straight line when adjusting it as hereinafter described it is highly important that the adjusting lever such as 25 be capable of bodily movement lengthwise, or otherwise the up and down adjustment of the inner or forward end of the reel shaft could not be accomplished. By using the pivoted sector shown in the said Clausen Patent No. 1,283,674 in connection with this adjusting lever it is evident that notwithstanding such lever is locked to the sector no interference is had with the free up and down movement given to the reel shaft because the sector itself is pivoted and swings back and forth as required.

26 indicates the central shaft upon which the heads 18 and 19 of the reel are secured, and by the rotation of which shaft the reel as a whole is driven. It has been customary to journal the end portions of this reel shaft in fixed bearings carried by the end members of the reel-supporting frame, but in order to accomplish the independent vertical adjustment of the reel at its inner or forward end a bearing is provided that is movable up and down to the required extent and held locked in any of its adjusted positions. Inasmuch as it is necessary, however, that the driving gear and pinion through whose intermeshing the shaft is rotated be maintained constantly in engagement a novel extensible and jointed connection between the end of the shaft and the said pinion has been provided. Referring now to these novel features,—27 indicates a wide heavy bracket depending from the cross-bar at the forward end of the rectangular frame 12, said bracket having therein a comparatively wide vertically-extending slot 28, as best shown in Fig. 3. One edge of this slot is toothed, as indicated by 29. 30 indicates a stem extending into the slot 28 from the outer face of the bracket and having a flange 31 to act as a limit stop. The stem 30 is provided with a socket of a size and shape to adapt it to receive the end of the squared reel-shaft 26, as indicated by dotted lines in Fig. 2, and, as also therein indicated, the shaft when entered in such socket is secured in place by a suitable pin or rivet. The outer surface of the stem that lies within the slot of the heavy bracket 27 is cylindrical and has mounted upon it, in the construction shown, a sleeve 32, and upon the sleeve is rotatably mounted a pinion 33, the teeth of which are in mesh with the rack 29 that is formed by the teeth on one edge of the slot 28. Inasmuch as the pinion 33 is only required to be given a partial rotation, it is shown with teeth only around a portion of its circumference—in other words a mutilated pinion. As shown in Fig. 2, one end of the pinion is cast with a small flange 34 that rests against the ribs on the inner face of the heavy bracket 27, as clearly shown in Fig. 2. To this flanged end of the mutilated pinion 33—and which pinion it will be noted extends to some distance beyond the teeth that it carries (see Fig. 2)—is securely affixed a hand lever 35 that will be provided with the usual spring latch for engaging the teeth of a sector, as indicated at 36 in Fig. 1, to hold the pinion in any position to which it may be adjusted with reference to the rack 29. The stem 30 is forked and in this fork is located a head or block 30^A that is pivotally secured in place by a pin or bolt 30^B. Said pivoted head or block has at opposite sides laterally-projecting studs 30^C upon which are pivotally mounted the two arms of a yoke 38, such yoke arms being secured to the studs by bolts 37 or otherwise. With the yoke is formed an elongated socket member 39, the socket of which is angular in cross-section and into which projects a correspondingly shaped stem 40 having on one end a head or block 40^A which fits between the forked end of a short stem 41^A to which it is pivotally secured by a pin or bolt 41^B. Upon laterally projecting studs 41^C carried by such head or block are pivotally mounted the two arms of a yoke 42 that are held in place by bolts 41 or otherwise. The said short stem 41^A has formed with it at that end opposite the yoke 42 in the construction shown, a bevel pinion 43, and from the other face of the bevel pinion extends a short axle or shaft 44 that is journaled in a bearing 45 supported from a member of the reel supporting frame adjacent to the main axle 11 of the machine, said short shaft 44 being secured in the bearing by means of a washer 46. In the construction shown the member of the supporting frame just referred to is in effect a supplemental frame section which is clearly shown in Fig. 1 and which is indicated by 47, and it is rigidly connected to the main frame member 12 in any suitable manner, and pivotally supported upon the axle 12. In effect it constitutes a part of the reel frame. 48 indicates a squared sleeve fitting over that portion of the reel shaft between the hub of the central gear 23 and the extended hub of the mutilated pinion 33, and serves as a spacing device between those parts.

Upon the main axle of the machine is suitably secured a bevel gear 49 which is normally in mesh with the pinion 43 and serves by its rotation with the axle to drive such pinion and the reel shaft connected therewith. The axle will be provided with suitable clutch mechanism, such as indicated generally by 50, by the operation of which the gear and pinion may be thrown out of engagement with each other when desired—such clutch mechanism being of any usual character and hence not necessary to here illustrate or describe in detail.

At any time when it is desired to adjust the forward or inner end of the reel independently of the adjustment given to the reel frame as a whole such adjustment will be accomplished by a proper movement of the lever 35, which, by rocking the pinion 33 causes such pinion to move up or down on the rack 29, as will be readily understood by reference to Fig. 3, and inasmuch as the inner or forward end of the reel shaft 26 is revolubly supported in said vertical adjustable pinion it is evident that such vertical motion will necessarily be imparted to the shaft and the reel members connected therewith. Of course, to allow for this movement the bearing for the outer end of the shaft must be loose enough to permit of such movement. Inasmuch as this vertical upward adjustment of the forward end of the reel shaft would carry the pinion 43 out of engagement with the gear 49 if the shaft were continued without a joint as far as the said pinion and because, if such shaft were so continued, the downward movement herein contemplated could not be effected because of the bearing of the pinion 43 against the gear 49, there has been provided the flexible construction hereinbefore described comprising the rocking connections afforded by the yokes 37 and 42 mounted on their respective pivot pins 37 and 41, and the sliding connections afforded by the stem 40 that enters the socket 39. It will be understood that by these means whenever the reel shaft is independently adjusted by means of the lever 36 and pinion 33 connected therewith the position of the pinion 43 with relation to the gear 49 will not be affected by the turning of the respective yokes on their pivots and that notwithstanding such turning may be to quite a considerable extent there will be no strain on or binding of the parts owing to the fact that the stem 40 will slide freely in the socket 39 to the extent desired. In whatever position the forward end of the reel shaft may be thus vertically adjusted the reel shaft will be properly driven inasmuch as the stem 40 is so engaged with the socket member 39 as to compel a rotation of that member and through the connection of that member with the stem 30 that is keyed or otherwise secured to the shaft the rotation of the shaft is of course, compelled.

By the construction and arrangement of the parts that connect the reel-shaft with the bevel pinion 43 it will be evident that such connecting means comprises two universal joints and thereby, in connection with the telescopic union of the members 39 and 40, provision is made for all possible variations in the relative relations of the reel-shaft and the said driven bevel pinion.

What is claimed as the invention and is desired to be secured by Letters Patent, is—

1. In a rotary rake, the combination of a frame, a rake-reel comprising a rotatable central shaft journaled loosely at one of its ends in the frame to permit the other end thereof to be vertically moved, a vertically-movable bearing for the other end of the shaft, a pinion supported at a distance from said movable bearing, sliding and pivoted means connecting said pinion and shaft, and a driving gear meshing with said pinion.

2. In a rotary rake, the combination of a frame, a rake-reel comprising a rotatable central shaft journaled loosely at one of its ends in the frame to permit the other end thereof to be vertically moved, a vertically-movable bearing for the other end of the shaft, a pinion supported at a distance from said movable bearing, sliding and pivoted means connecting said pinion and shaft, a driving gear meshing with said pinion, and means for vertically adjusting the reel-frame independently of the adjustment of the reel-shaft.

3. In a rotary rake, the combination of a frame, a rake-reel comprising a rotatable central shaft journaled loosely at one of its ends in the frame to permit the other end thereof to be vertically moved, a vertically-movable bearing for the other end of the shaft, a pinion rotatably supported at a distance from said movable bearing, a pair of members slidingly but non-rotatively connected with each other and pivotally connected, respectively, with said pinion and shaft, and a driving gear meshing with said pinion.

4. In a rotary rake, the combination of a frame, a rake-reel comprising a rotatable central shaft journaled loosely at one of its ends in the frame to permit the other end thereof to be vertically moved, a slotted bracket carried by the frame in which is mounted a vertically-adjustable bearing for said other end of the shaft, means for holding said bearing in different adjusted positions in said bracket, a pinion fixedly supported at a distance from said movable bearing, sliding and pivoted means connecting said pinion and shaft, and a driving gear meshing with said pinion.

5. In a rotary rake, the combination of a frame, a rake-reel having a shaft journaled in the frame, a slotted bracket carried by the frame, a rack on said bracket, a pinion located in the slot in the bracket and rotatably supporting said shaft, said pinion being in engagement with said rack, a lever for turning said pinion to move it along the rack to cause a vertical adjustment of the shaft, a pinion rotatably supported in a fixed position at a distance from said first-named pinion, flexible means connecting said second-named pinion with said shaft, and a driving gear meshing with said second-named pinion.

6. In a rotary rake, the combination of a frame, a rake-reel having a shaft journaled in the frame, a slotted bracket carried by the frame, a rack on said bracket, a pinion located in the slot in the bracket and rotatably supporting said shaft, said pinion being in engagement with said rack, a lever for turning said pinion to move it along the rack to cause a vertical adjustment of the shaft, a pinion rotatably supported in a fixed position at a distance from said first-named pinion, sliding and pivoted means connecting said second-named pinion and shaft, and a driving gear meshing with said second-named pinion.

7. In a rotary rake, the combination of a diagonally-arranged frame, a wheeled support at its forward end with which said frame is pivotally connected, a ground-engaging support at the rear of said frame, means for adjusting said frame vertically relatively to said support, a rotatable reel journaled in said frame comprising two heads, a central shaft and a plurality of tooth-carrying bars extending between said heads, gearing carried by one of said heads and connected with the tooth-carrying bars for maintaining the rake-teeth in position, an adjusting lever connected with said gearing for turning the same to change the position of the rake-teeth, a movable device mounted on the frame for interlocking with the lever, means for rotating and independently adjusting the inner end of the reel comprising a vertically movable bearing, a pinion rotatably supported at a distance from said bearing, sliding and pivoted means interposed between and connected to said pinion and shaft, and a driving gear in mesh with said pinion.

JOSEPH DAIN, Jr.,
*Administrator of the estate of Joseph Dain, deceased.*